United States Patent Office 3,773,774
Patented Nov. 20, 1973

3,773,774
PYRIDYL AZIDES AND DERIVATIVES THEREOF
Calvin E. Pannell, Walnut Creek, Calif., assignor to The Dow Chemical Company, Midland, Mich.
No Drawing. Filed Mar. 1, 1972, Ser. No. 230,975
Int. Cl. C07d 31/46
U.S. Cl. 260—294.9         3 Claims

ABSTRACT OF THE DISCLOSURE

The invention is a group of compounds of the formula

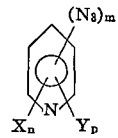

wherein X is halogen; Y is nitrile, carboxamide, carboxyl, ester or trihalomethane; $m$ is 1–4; $n$ is 0–4; $p$ is 0–2; and $m+n+p$ is 2–5. The compounds, which generally may be prepared by introducing the azide moiety by exchange with a ring halogen, have been found to be useful as high energy compounds, such as detonators.

SUMMARY OF THE INVENTION

The invention is a group of compounds of the formula

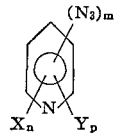

wherein each X is, indenpendently, Cl, Br, I or F; Y is

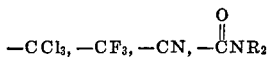

(each R independently being H, aryl (phenyl or naphthyl) or an alkyl group of up to about 18 carbon atoms), —COOH or —COOR' (R' being the residue of an esterifiable organic hydroxy compound—such as alkyl, aryl, alkaryl and aralkyl esters with up to 18 carbons in the alkyl portion); $m$ is 1 to 4; $n$ is 0 to 4; $p$ is 0 to 2; and the sum of $m+n+p$ is from 2 to 5.

The compounds of this invention may be prepared from known starting materials by exchanging an active ring-substituted halogen for an azide. They may also be prepared by diazotization of a ring-substituted amine group, with subsequent exchange of said azo group for an azide group.

The compounds have been found to be useful as high energy compounds, such as detonators, propellants, and the like.

Those compounds in the above formula wherein $m$ is 3 to 4, Y is CN, $p$ is 1 to 2 and $n$ is 0 are preferred.

DETAILED DESCRIPTION OF THE INVENTION

The compounds of the invention are prepared by replacing one or more ring-substituted halogens with an azide. Metal azides, such as NaN$_3$, or KN$_3$, are suitable for said replacement.

The reaction conditions depend upon the reactivity of the particular pyridine compound in question. A reactive halogen compound, such as 2-cyano-3,4,5,6-tetrachloropyridine, will react readily with room temperature, overnight stirring of a methanolic solution of the reactants. Less reactive materials will either require longer reaction times, higher reaction temperatures or the use of a more favorable solvent, such as dimethylformamide. No effort should be made to force the reaction by use of severe conditions until trial micro-experiments furnish definite knowledge regarding the stability of the resulting azide reaction products. Generally speaking, a direct relationship exists concerning instability and the number of azide groups per molecule, the monoazide compounds usually being the most stable.

The degree of substitution is dependent upon the relative quantity of metal azide used and whether the pyridine compound contains activating groups or easily replaceable halogen, especially a halogen in the two position.

The normal reaction course involves a stepwise reaction sequence, the four or para position generally being the most reactive, followed by the two and six positions. A different reaction mechanism occurs once a two or six position is substituted with an azide group. The overall sequence is generally as follows:

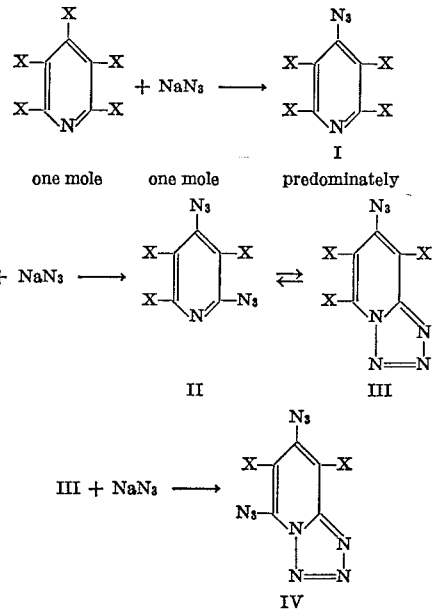

It is to be noted that compound III is in equilibrium with the adjacent heterocyclic nitrogen and forming a tetrazole. This azide-tetrazole transformation profoundly alters the reactivity of the remaining ring halogens with the six-position chlorine atom reacting as soon as compound III forms. The final result is that compound III is generally a transitory intermediate.

Trichloromethyl- or trifluoromethyl-substituted pyridyl azides, with or without halogen substituents, may be prepared from, for instance, 3-amino-3,5,6-dichloro-2-trichloromethylpyridine (U.S. Pat. 3,224,950); 2,3,4-trichloro-2-trichloromethylpyridine (U.S. Pat. 3,256,167); 6-chloro-2-trichloromethylpyridine (U.S. Pat. 3,418,323); and, halo, trifluoromethylpyridines (U.S. Pat. 3,609,158). Other trihalo-containing pyridines are taught in Chemistry of Pyridine Derivatives by Edwin Klingberg (Interscience, 1961), specifically in part 2, pp. 398–99.

Pyridyl azides with cyano substituents may be prepared, for instance, from 4-NR$_2$ (R is H or alkyl)-2-cyano-3,5,6-trichloropyridine (U.S. Pat. 3,285,925); halo- and cyano-substituted pyrdines are made according to the process taught in U.S. Pat. 3,420,833; polybromo, cyanopyridines (U.S. Pat. 3,595,868); chlorocyanopyridines (U.S. Pat. 3,591,597); and, polychloro, mono- or dicyanopyridines (U.S. Pat. 3,325,503).

COOH-, COOR- or CONR$_2$-substituted pyridyl azides may be prepared from, for instance, 4-NR'$_2$ (R' is H or alkyl)-2-COOH or CONR$_2$-3,5,6-trichloropyridines (U.S. Pat. 3,285,925); 3,6-dichloropicolinic acid (U.S. Pat. 3,317,549); or Klingberg, part 3, pp. 303–07.

Polyhalopyridines are taught, for instance, in U.S. Pats. 3,303,197, 3,557,124, 3,186,994, 3,555,032 and 3,595,868; Belgian Pat. 660,873; and Klingsberg, part 2, pp. 385–91. Haloaminopyridines are also taught in U.S. Pats. 3,224,950 and 3,285,925, and in Klingsberg, part 2, pp. 385–91 and part 3, pp. 83–6.

As a general procedure, the pyridine and a metal azide are stirred into solution in a solvent, such as dimethylformamide, and the solution optionally heated. When the replacement reaction is complete, the resulting pyridyl azide may be precipitated in water, extracted with ether, recrystallized from sec-butyl alcohol for determination of melting point. Caution was exercised due to the expectation of impact and friction sensitivity.

Melting point was found to be 99.5°–103.5° C., and analysis showed the sample to be tetraazidopicolinonitrile.

EXAMPLES 2–13

In a manner similar to Example 1, the following pyridyl azide compounds were prepared by reacting the proper pyridine with $NaN_3$. Starting material and conditions are listed in the following table:

| Ex. No. | Starting material and weight used | Solvent and amount | Grams $NaN_3$ | Reaction Time (hours) | Temp., (° C.) | Pyridyl azide recovered |
|---|---|---|---|---|---|---|
| 2 | 0.05 moles of pentachloropyridine | 150 ml., DMF | (1) | 2 | 90 | 3,5-dichloro-2,4,6-triazidopyridine. |
| 3 | 0.2 moles of pentachloropyridine | 375 ml., DMF | (2) | 3 | 70 | 4-azido-tetrachloropyridine. |
| 4 | 1.12 gm. of tetrachloropicolinic acid. | 100 ml., DMF | 1.12 | 24 | 65 | 3-azido-trichloropicolinic acid. |
| 5 | 8.4 gm. of 2,4,6-tribromopyridine | 50 ml., DMF | 1.63 | 36 | 25 | 75 mole percent-4-azido-2,6-dibromopyridine 25 mole percent-4,6-diazido-2-bromopyridine. |
| 6 | 18.2 gm. of 2,3,6-trichloropyridine | 100 ml., DMF | 6.5 | 72 | 60 | 2,6-diazido-3-chloropyridine. |
| 7 | 30.4 gm. of 2,3,4,5-tetrachloropyridine. | 450 ml, MeOH | 9.1 | 72 | 60 | 4-azido-2,3,5-trichloropyridine. |
| 8 | 5 gm. of 2,4,6-trifluoro-3,5-dichloropyridine. | 50 ml., DMF | 1.63 | 36 | 25 | 4-azido-2,6-difluoro-3,5-dichloropyridine. |
| 9 | 70.5 gm. of tetrachloro-2-cyanopyridine. | 500 ml., MeOH | 18.8 | 18 | 25 | 4-azido-2-cyanotrichloropyridine. |
| 10 | 12.1 gm. of tetrachloro-4-cyanopyridine. | 50 ml., DMF | 3.25 | 18 | | 2-azido-4-cyanotrichloropyridine. |
| 11 | 12.1 gm. of tetrachloro-3-cyanopyridine. | 50 ml., DMF | 3.3 | 18 | 80 | 6-azido-3-cyanotrichloropyriine. |
| 12 | 23.8 gm. of tetrachloro-2-trichloromethylpyridine. | 250 ml., DMF | 6.96 | 24 | 25 | 4,6-diazido-3,5-dichloro-2-trichloromethylpyridine. |
| 13 | 0.02 mole of 2,6-bis(trichloromethyl)-trichloropyridine. | 150 ml., DMF | (3) | 24 | 25 | 80 mole percent 4-azido-3,5-dichloro- and 20 mole percent 4,5-diazido-3-chloro-2,6-bis(trichloromethyl)-pyridine. |

¹ 0.264 moles.  ² 0.2 moles.  ³ 0.022 moles.

the solvent evaporated, and the azide recrystallized from a solvent, such as sec-butyl alcohol.

It is to be noted that the resulting compounds may well be shock and/or friction sensitive. Extreme care should also be taken when heating, particularly as the number of azide groups increases.

Care should be further exercised when elemental analyses are being conducted. Microanalysis can be successfully accomplished providing the microanalyst has sufficient background regarding the successful combustion of high energy compounds. Adequate shielding of the combustion tube is essential.

The utility of these materials in high energy fuels and detonators is based upon their fuel value as well as direct and reproducible energetics of decomposition. These azides are compatible with hydrazine and the UDMH mixture, thus permitting one to modify the $N_2O_4$-hydrazines liquid propellant system. The impact sensitivity of the polyazide compounds coupled with the completely non-metallic decomposition gases results in reduced fouling and barrel corrosion. Solid propellant formulations, especially for flare applications, are preferred utilities.

SPECIFIC EMBODIMENTS

Example 1.—Tetraazidopicolinonitrile 24.2 gm. (0.1 mole) of tetrachloropicolinonitrile was mixed with 32.5 gm. (0.5 mole) of $NaN_3$, the entire mass then being slurried with 100–150 ml. of dimethylformamide (DMF). The material dissolved upon heating to 60° C., whereupon it was stirred at that temperature for 18 hours.

The solution, which contained suspended NaCl, was poured into ice water and the solids were filtered and washed with water several times. A small quantity was

EXAMPLE 14

A brass chamber (10 mm. in diameter, constricted at one end to 7.62 mm.) is charged with "Belgian Ball" propellant. At the base of the 10 mm. chamber, a quantity of 2-cyanotetraazidopyridine is affixed in a manner that impacting energy will be transmitted to the azide compound. Impact is accomplished by use of a hardened steel impactor and smooth discharge of the "Ball Powder" results.

The detonator could similarly be discharged by utilizing an electric spark.

I claim:

1. A compound of the formula

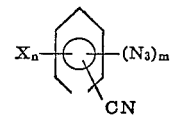

wherein each X is independently Cl, Br or F; m is 1 to 4; n is 0 to 3; and m+n is 1 to 4.

2. Tetraazidopicolinonitrile.

3. The compound of claim 1 wherein X is Cl.

References Cited

FOREIGN PATENTS 1,161,492  8/1969  Great Britain ____ 260—294.8 F

ALAN L. ROTMAN, Primary Examiner

U.S. Cl. X.R.

149—109; 260—295 AM, 295 R, 295.5 A, 295.5 R, 296 R, 296 H

PO-1050
(5/69)

UNITED STATES PATENT OFFICE
CERTIFICATE OF CORRECTION

Patent No. 3,773,774      Dated November 20, 1973

Inventor(s)   Calvin E. Pannell

It is certified that error appears in the above-identified patent and that said Letters Patent are hereby corrected as shown below:

Column 4, line 12 in Table, Example No. 11 under "Pyridyl azide recov should read -- 6-azido-3-cyanotrichloropyridine. --

Column 4, line 46 formula should be:

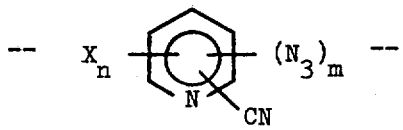

Signed and sealed this 26th day of November 1974.

(SEAL)
Attest:

McCOY M. GIBSON JR.
Attesting Officer

C. MARSHALL DANN
Commissioner of Patents